United States Patent
Vickery et al.

(10) Patent No.: US 8,140,961 B2
(45) Date of Patent: Mar. 20, 2012

(54) AUTOMATED RE-ORDERING OF COLUMNS FOR ALIGNMENT TRAP REDUCTION

(75) Inventors: Brian Shaun Vickery, Los Gatos, CA (US); Anoop Sharma, San Jose, CA (US); Vinita Subramanian, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1067 days.

(21) Appl. No.: 11/986,593

(22) Filed: Nov. 21, 2007

(65) Prior Publication Data
US 2009/0132518 A1 May 21, 2009

(51) Int. Cl.
*G06F 15/00* (2006.01)
*G06F 17/30* (2006.01)

(52) U.S. Cl. ........ 715/227; 715/205; 715/234; 715/273; 707/752; 707/802; 707/E17.044

(58) Field of Classification Search ............... 715/200, 715/209, 226, 227, 229, 231, 234, 247, 253, 715/255, 256, 273, 762; 707/752, 753, 801, 707/802, 825, E17.044
See application file for complete search history.

(56) References Cited

U.S. PATENT DOCUMENTS

| | | | |
|---|---|---|---|
| 5,701,517 A * | 12/1997 | Carpenter | 710/66 |
| 6,421,681 B1 * | 7/2002 | Gartner et al. | 707/999.102 |
| 6,613,099 B2 | 9/2003 | Crim | |
| 6,658,432 B1 | 12/2003 | Alavi et al. | |
| 6,831,575 B2 | 12/2004 | Wu et al. | |
| 6,985,392 B2 * | 1/2006 | Bateman et al. | 365/200 |
| 7,003,517 B1 | 2/2006 | Seibel et al. | |
| 7,010,518 B1 | 3/2006 | Bedell et al. | |
| 7,082,427 B1 | 7/2006 | Seibel et al. | |
| 7,103,608 B1 | 9/2006 | Ozbutun et al. | |
| 7,260,577 B1 | 8/2007 | Alavi et al. | |
| 7,293,008 B2 | 11/2007 | Potter et al. | |
| 2002/0143521 A1 * | 10/2002 | Call | 704/1 |
| 2002/0194191 A1 * | 12/2002 | Sexton et al. | 707/102 |
| 2003/0173269 A1 * | 9/2003 | Breden | 209/584 |
| 2005/0010590 A1 | 1/2005 | Blaicher | |
| 2005/0132244 A1 * | 6/2005 | Milway | 713/400 |
| 2005/0198011 A1 | 9/2005 | Barsness et al. | |
| 2007/0067478 A1 | 3/2007 | Verplanken et al. | |

FOREIGN PATENT DOCUMENTS

KR 10-2000-0031438 6/2000

OTHER PUBLICATIONS

International Searching Authority, The International Search Report And The Written Opinion, 11 pages.

* cited by examiner

*Primary Examiner* — Maikhanh Nguyen

(57) ABSTRACT

An automated method to align column values to proper byte boundaries for rapid scanning in a parallel processing database system. A table definition is received having a logical order of fields. The fields are re-ordered to create a physical order of fields. The physical order of fields has fixed length fields having a same byte alignment requirement positioned adjacent to each other in descending order from largest size to smallest size, and wherein a first fixed length field in the physical order is aligned on a proper byte boundary. Other embodiments, aspects and features are also disclosed.

9 Claims, 7 Drawing Sheets

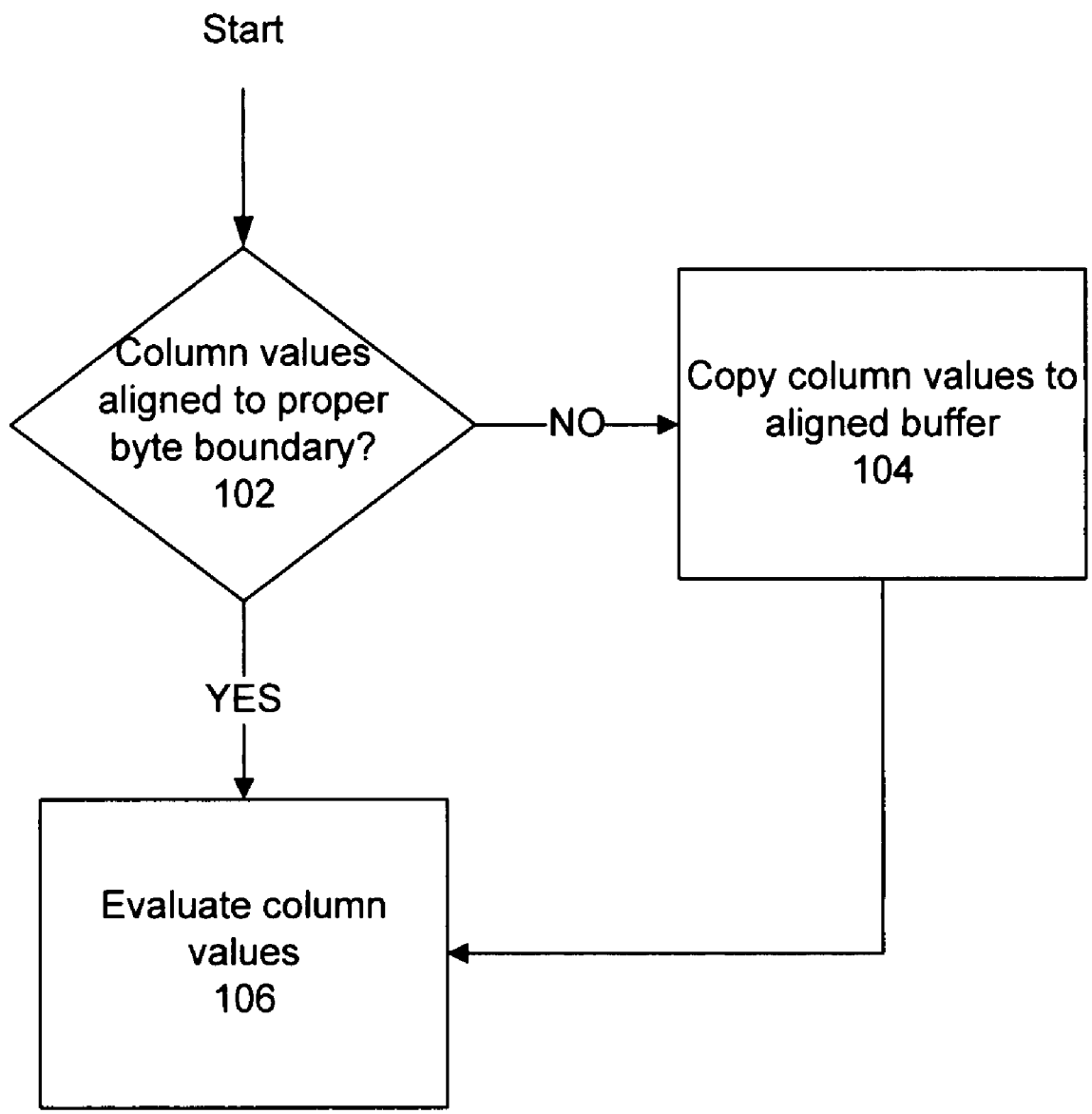
FIG. 1
(conventional)

```
Create Table CUSTOMER (
    custKey      int                        not null not droppable,
    name         varchar(25)                not null not droppable,
    address      varchar(40)                not null not droppable,
    nationKey    int                        not null not droppable,
    phone        char(15)                   not null not droppable,
    acctBal      numeric(12,2)              not null not droppable,
    mktSeg       char(10)                   not null not droppable,
                                            default '',
    comment      varchar(117)               default null,
    primary key (c_custkey) not droppable) ;
```

FIG. 3

| FF | BO | VO$_1$ | VO$_2$ | VO$_3$ | bitmap |///| acctBal | custKey | nationKey | phone | mktSeg | | name| | address | | comment | /// |

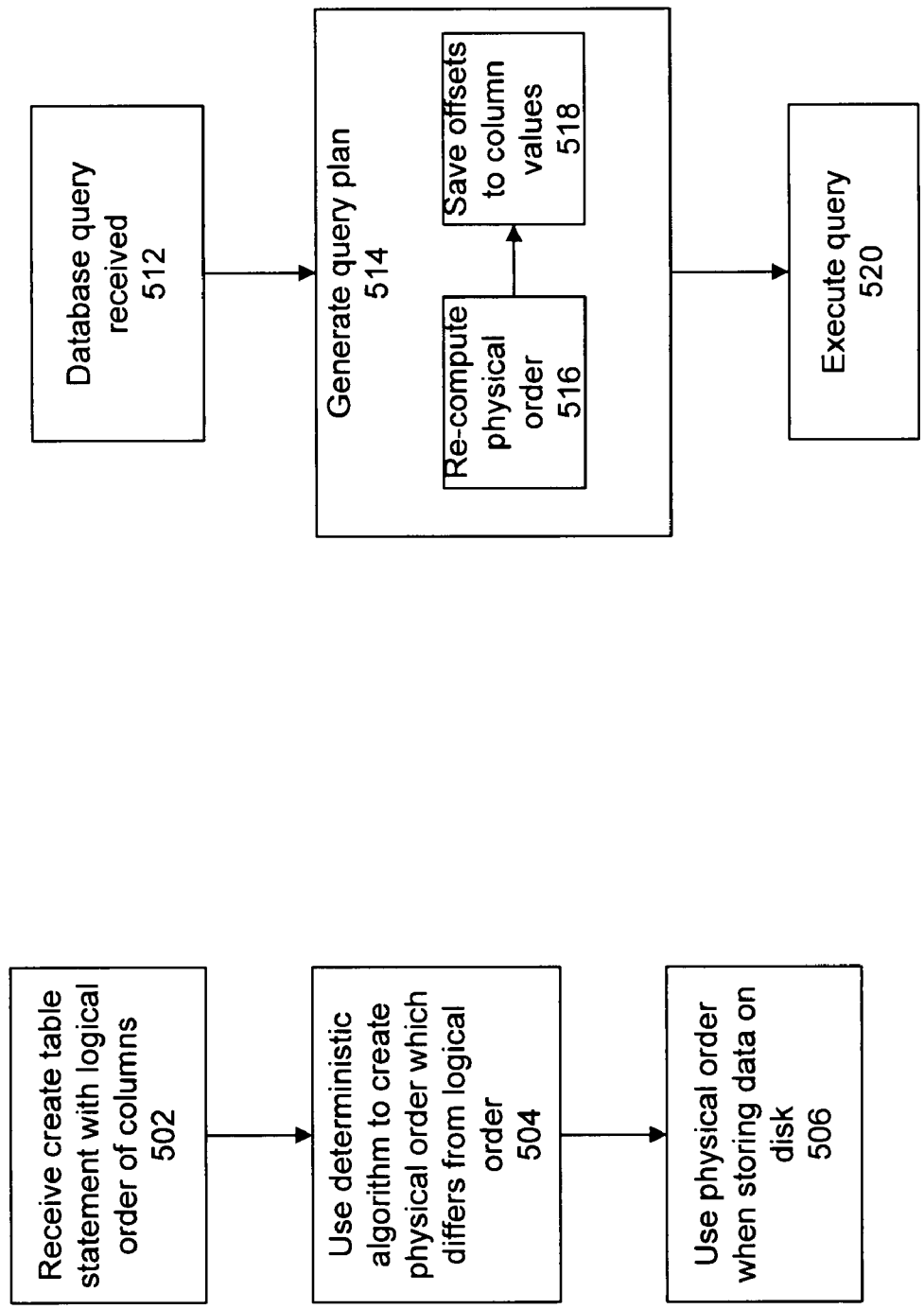

|  | QPH | | | CPU Seconds per Qry | | |
| --- | --- | --- | --- | --- | --- | --- |
|  | Non-Aligned | Aligned | % Change | Non-Aligned | Aligned | % Change |
| acxiom032_b6_m | 327 | 348 | 6.42% | 315.58 | 306.18 | -3.00% |
| dwp2x1_b6_s | 113 | 114 | 0.88% | 959.6 | 899.45 | -6.30% |
| dwp2x2_b6_s | 132 | 137 | 3.79% | 1637.65 | 1513.75 | -7.60% |
| hpit032_b6_m_4 | 2621 | 2839 | 8.32% | 26.68 | 25.35 | -5.00% |
| hpit032_b6_m_8 | 3541 | 3680 | 3.93% | 27.07 | 25.74 | -4.90% |
| hpit032_b6_m_16 | 3812 | 4143 | 8.68% | 27.51 | 26.2 | -4.70% |
| hpit032_b6_m_32 | 4227 | 4546 | 7.55% | 27.71 | 26.42 | -4.70% |
| ph2x100_b6_s | 13856 | 14246 | 2.81% | 896.29 | 864.76 | -3.50% |
| ph2x200_b6_s | 13475 | 13742 | 1.98% | 1833.35 | 1770.76 | -3.40% |

FIG. 5C

AUTOMATED RE-ORDERING OF COLUMNS FOR ALIGNMENT TRAP REDUCTION

BACKGROUND

1. Field of the Invention

The present application relates generally to computer and software systems. More particularly, the present application relates to database systems.

2. Description of the Background Art

Business intelligence (BI) databases process large amounts of data residing on many disks within a Massively Parallel Processing (MPP) system. The amount of data stored for BI databases is growing at significant rates, and BI databases require scanning more and more data. The table data is partitioned across many disks to enable parallelizing scans and filtering of the table data. Moreover, as the data grows, more disks are added, requiring ever faster scan rates.

BRIEF DESCRIPTION OF THE DRAWINGS

FIG. 1 is a flow chart showing a conventional method of dealing with alignment traps using an aligned buffer.

FIG. 3 shows an example create table statement which specifies a logical ordering of fields (columns) within a data row of the database.

FIG. 4 shows a re-ordering of the fields for physical storage on disk in accordance with an embodiment of the invention.

FIG. 5A is a flow chart showing reception of a create table statement and use of a deterministic method to generate a physical order to be used for storing data on disk in accordance with an embodiment of the invention.

FIG. 5B is a flow chart showing reception of a database query and re-computation of the physical order to be used in accessing data from disk in accordance with an embodiment of the invention.

FIG. 5C shows experimental results indicating a pathway improvement for various schemas tested in accordance with an embodiment of the invention.

DETAILED DESCRIPTION

Figure 2:
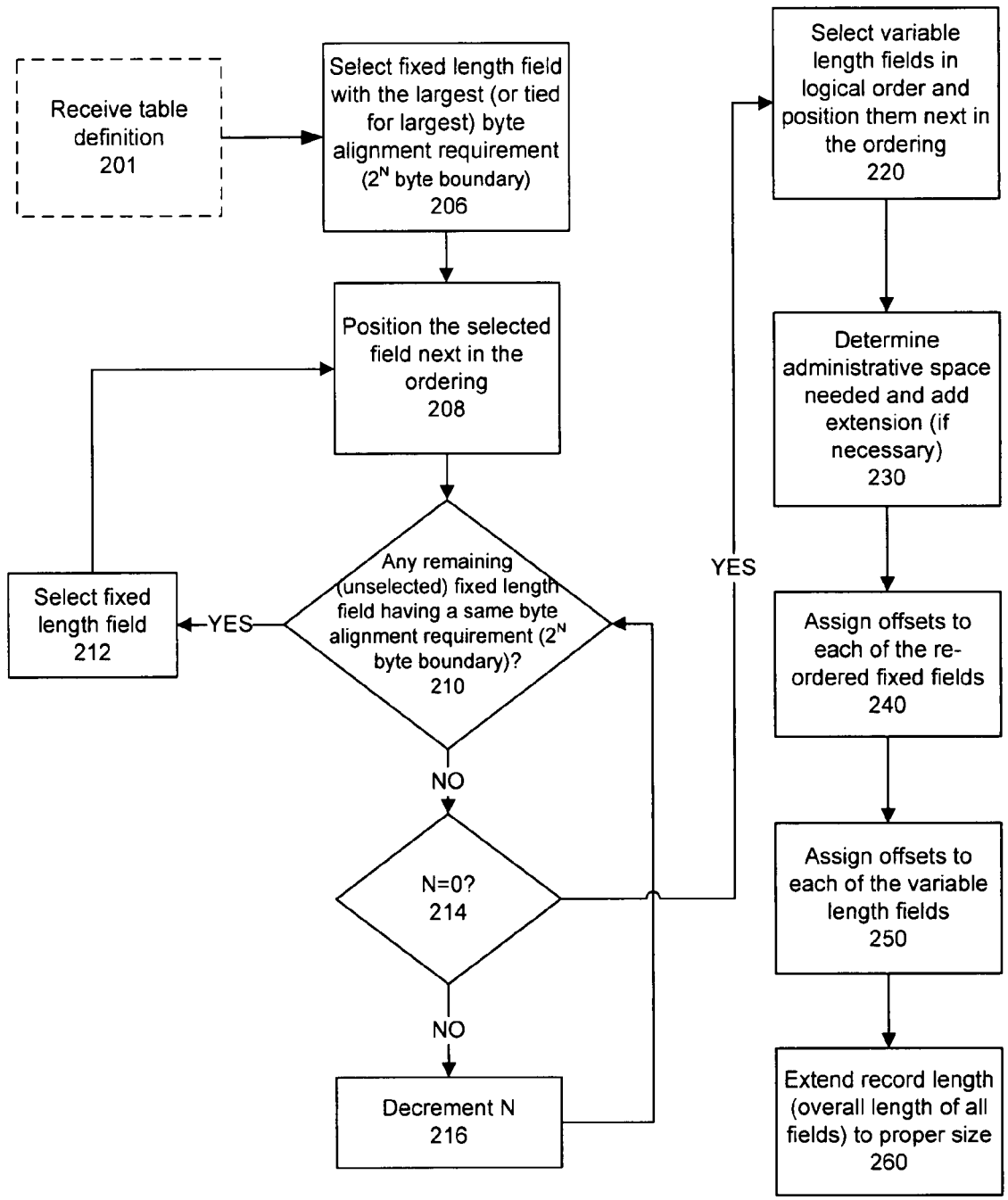
FIG. 2 is a flow chart depicting a method of performing the automated re-ordering for alignment trap reduction in accordance with an embodiment of the invention.

The amount of data needing to be processed in Business Intelligence (BI) databases is growing at a significant rate. As such, scanning large amounts of data and filtering out the data rows that are needed in an efficient manner is a major challenge facing BI databases. Any improvement in the scanning of the data can substantially improve the overall throughput of all queries in the system.

Databases typically push scan predicates down to the lowest layers, when possible, to reduce copying large amounts of data around the system that is eventually discarded. To efficiently evaluate scan predicates on data residing within the Data Access Manager layer, the column values generally have to be on their proper byte boundaries.

Numeric column values not on their proper byte boundaries cause so-called alignment traps (alignment fix-ups). In an alignment trap, the data needs to be copied to an aligned buffer before being evaluated. Hence, alignment traps result in a performance penalty. The more columns that make up the filtering predicate, the higher the cost since each column is handled independently.

In BI scenarios, there are many tables with many columns such that proper alignment by a user would be a very time consuming process. BI customers can, in theory, define their tables such that the columns are properly aligned as much as possible, but this assumes that the customer knows the underlying layout to some degree and the proper alignment required for each column type. In addition, this assumes the customer can be relied upon to make such alignment efforts for each table created, as the table definition will most likely be different for each database. Moreover, if there are variable length fields in the table, then the user cannot ensure every data row will start on an aligned boundary since only the actual number of bytes in the value are stored and not the maximum length.

The present application relates to techniques for aligning columns to proper byte boundaries. A simple technique for aligning columns to proper byte boundaries would be to align all the fields within a data record in the order specified in the create table statement. However, this would implicitly require padding to be added between the column values of different data types, and so would require additional disk space to allow table data to spread and grow to accommodate the extra padding.

Another technique is to have an offset array for all fields. This technique keeps all fields in the same logical order as specified in the table definition. This technique requires configuring the hardware or firmware to detect the misaligned data and align it properly, or configuring the Data Access Manager layer to detect this misalignment and correct it.

Another technique for aligning columns to proper byte boundaries is to pack all the fixed length fields of a record together tightly. Subsequently, during scan predicate evaluation, the pointer may be checked to see if it is on the proper byte boundary for the field. If the pointer is not on the proper byte boundary for the field, then the data is copied to a side buffer to use for evaluation. A flow chart of this technique is given in FIG. 1. As seen in FIG. 1, a determination 102 is made as to whether column values are aligned to a proper byte boundary. If so, then the column values may be evaluated 106. If not, then an additional step is needed where the column values are copied 104 to an aligned buffer (side buffer). Thereafter, the column values (now in the aligned buffer) may be evaluated 106. The determination 102 must be done for every column being evaluated in every row.

The present application discloses a new technique for aligning columns to proper byte boundaries in which columns as specified in the table definition are re-ordered in an advantageous manner so as to reduce the occurrence of alignment traps. In other words, to improve scan predicate evaluation, the logical order of the columns specified within a create table statement are re-ordered based on each field's proper byte alignment and then stored in this physical order within a data record on disk. This re-ordering of the fields is performed in an automated manner during the creation of the table, and when inserting, updating, deleting and scanning records. This technique thus improves alignment of columns to proper byte boundaries without the customer having to perform such tasks manually and without additional implicit padding between column values.

FIG. 2 is a flow chart depicting a method of performing the automated re-ordering for alignment trap reduction in accordance with an embodiment of the invention. This method determines a physical ordering to be stored on computer-readable media (i.e. on disk). The method is performed after receiving a create table statement which specifies or defines a logical order of fields for a database table (see block 201).

Conventionally, the physical order of the columns is typically the same as the logical order specified in the create table statement. In contrast, the present application discloses an automated re-ordering of the columns such that the physical order of the columns as stored on disk may differ significantly from the logical order specified in the create table statement. The steps shown in FIG. 2 are used to re-order the columns (fields) so as to determine the physical order to be stored on disk and the fixed offsets of each field within the data row.

A byte-alignment-required fixed length field is a field which requires alignment to a proper byte boundary before being evaluated (see above discussion in relation to FIG. 1). In a typical database system under discussion, for example, numeric fields and integer fields are byte-alignment-required fixed length fields. A byte-alignment-required fixed length field requires alignment to a $2^N$ (two to the Nth power) byte boundary, where N is a whole number.

In a first step 206, the fixed length field with the largest (or tied for largest) byte alignment requirement (i.e. with the largest N) is selected. Per the next step 208, the selected field is positioned (packed) next in the physical ordering.

Subsequently, a determination 210 is made as to whether or not any field having a byte alignment requirement to a $2^N$ byte boundary remains (has not yet been selected). If there is one or more such field remaining (not yet selected), then one of these remaining fields is selected per step 212, and the method loops back so that the selected field is positioned (packed) next in the physical ordering per step 208.

On the other hand, if it is determined 210 that there are no more fields having a byte alignment requirement to a $2^N$ byte boundary remaining (not yet selected), then a further determination 214 may be made as to whether N is zero. If N is not zero, then N is decremented by one in step 216 and the method loops back to step 210 so as to determine whether or not any field having a byte alignment requirement to a $2^N$ byte boundary remains based on the decremented value for N.

On the other hand, if it is determined 214 that N is zero, then no more fields having a byte alignment requirement remains so the method moves on and selects the variable length fields in their logical order (as specified in the create table statement) and positions them next in the physical ordering per step 220.

In a subsequent step 230, the administrative space needed is determined. This administrative space at the start of each data record will be zero padded and then appropriate header information will be added when creating a data record. The administrative space will be extended out (using zero padding) to ensure the proper alignment of the first field.

Thereafter, per step 240, the method goes through the re-ordered fixed fields and assigns offsets for each of them. These re-ordered fixed length fields will all be packed together since the re-ordering begins with the largest aligned fields.

Then, per step 250, the method goes through the variable length fields and assigns offsets for each of them picking up after all fixed length field offsets. Finally, per step 260, the overall length of all fields are extended to a proper size assuming a maximum size for the variable length columns.

Note that padding before the first fixed length field and at the end of the data record will be added when inserting or updating a record.

An example create table statement is shown in FIG. 3. In the example statement of FIG. 3, the table named CUSTOMER is being defined. The fields or columns of the table, in logical order, are defined to be custKey, name, address, nationKey, phone, acctBal, mktSeg, and comment.

The create table statement also defines the type of field for each of the columns. As shown in the example of FIG. 3: the custKey field is an integer field; the name column is a variable character field which may be up to 25 bytes in length; the address column is a variable character field which may be up to 40 bytes in length; the nationKey field is an integer field; the phone column is a fixed character field which is 15 bytes in length; the acctBal column is a numeric field of width 12 and 2 decimal places stored in 8 bytes; the mktSeg column is a fixed character field which is 10 bytes in length; and the comment column is a variable character field which is up to 117 bytes in length. Other characteristics are also defined in the create table statement, including the primary key for the table, default values, and whether or not the fields are droppable. Of course, FIG. 3 shows just one example create table statement for purposes of discussion.

FIG. 4 shows an order of fields for physical storage on disk given the example create table statement of FIG. 3 and using the re-ordering method described above in relation to FIG. 2. The top portion of FIG. 4 shows the columns after re-ordering for physical storage, and the bottom portion shows a corresponding byte count in the record.

As seen in FIG. 4, the first columns in the re-ordered record are administrative bytes or a fixed size overhead at the start of the record in the space determined per step 230 of FIG. 2. In this example, FF is a two-byte field with a value which indicates an offset to the first fixed length field in the data record or zero (if none), and BO is a two-byte field with a value which indicates an offset to the null bitmap (discussed below) if one exists or zero (if none).

Variable length fields only store the bytes that are used and not the maximum number of bytes. Hence, the actual length for each variable length field must be stored. In this case, the lengths are stored adjacent to and preceding the value for each variable length field. The $VO_k$ fields indicate offsets to the variable length fields. In this case, $VO_1$ is a two-byte field which indicates the offset to the first variable length field, $VO_2$ is a two-byte field which indicates the offset to the second variable length field, and $VO_3$ is a two-byte field which indicates the offset to the third variable length field.

The bitmap field is a four-byte field storing the null bitmap mentioned above. The null bitmap contains the null status of each field with one bit per nullable field. In other systems, the null indicator for a given column value generally precedes the column value. This would throw off the proper byte ordering for a column value (no matter whether the null indicator was one byte or two bytes). Hence, in accordance with an embodiment of the invention, the null indicator for a given column is stored in the null bitmap field which is stored separately from the actual column value.

Note that, after the bitmap field, the III indicates padding (zero padded) to be packed after the administrative bytes. In this particular case, there are two bytes of padding such that the next field starts on byte 16 (an 8-byte boundary). The amount of padding needed here differs depending on the boundary alignment requirement of the fixed length fields in the table.

The first byte-alignment-required fixed length field is positioned immediately after the padding. In this case, the first byte-alignment-required fixed length field is the 8-byte (N=3) acctBal numeric field which is selected first because it is the longest fixed length field per step 206 of FIG. 2. There are no other fixed length fields with an 8-byte boundary alignment requirement, so N is decremented from 3 to 2 as per step 216 of FIG. 2.

The subsequent byte-alignment-required fixed length field are positioned immediately after the first byte-alignment-required fixed length field. In this case, the second byte-alignment-required fixed length field is the 4-byte (N=2) custKey integer field, and the third fixed length field is the 4-byte (also N=2) nationKey integer field. There are no other fixed length fields with a 4-byte boundary alignment requirement. Further, there are no fixed length fields with a 2-byte (N=1) boundary alignment requirement.

Next, the fixed length fields with a 1-byte (N=0) boundary alignment requirement are selected and positioned in the ordering. For example, character fields are fixed length fields with a 1-byte boundary alignment requirement. In this case, the next column is the phone field which is a 15-byte long character field and starts at byte number 32, and the following column is the mktSeg field which is a 10-byte long character field and starts at byte number 47.

Thereafter, per step 220 of FIG. 2, the variable length fields are selected in their logical order and positioned in the ordering. In this embodiment, the first part of each variable length field (represented by ‖ in FIG. 4) are two bytes indicating the actual length of the value stored in that field. Thereafter, the actual bytes of the variable length value are placed.

In this case, the first variable length field is the name field and starts at byte number 57. This offset to byte number 57 for the first variable length field indicated in the value of the $VO_1$ field discussed earlier. As mentioned above, the first two bytes of the field indicate the actual length, and the remaining bytes are the actual data stored in the field. Similarly, the second variable length field is the address field that starts at byte $v_2$ (which varies depending on the length of the preceding first variable length field), and the third variable length field is the comment field that starts at byte $v_3$ (which varies depending on the lengths of the preceding first and second variable length fields).

Note that, when a record is stored, pad bytes (represented by III) are added to the end of the record, if necessary, so that the next data record starts with proper alignment. In this implementation, there may be 1 to 3 such ending pad bytes such that the next record starts upon a 4-byte boundary. The number of pad bytes used per record are stored as part of the first fixed offset, FF, in the high 2 bits.

FIG. 5A is a flow chart showing reception of a create table statement and use of a deterministic method to generate a physical order to be used for storing data on disk in accordance with an embodiment of the invention. As shown, a create table statement is received from a user (block 502). The create table statement defines a logical order for columns (fields) of the database table. Thereafter, using a deterministic algorithm as discussed above, a physical order is created which differs from the logical order specified by the create table statement (block 504). The physical order is used when storing data records on disk (block 506).

Advantageously, the re-ordering from logical to physical order is deterministic. Hence, information about the actual physical ordering does not necessarily need to be saved and may be re-computed during query plan generation. FIG. 5B is a flow chart showing reception of a database query and re-computation of the physical order to be used in accessing data from disk in accordance with an embodiment of the invention. As shown, a database query is received (block 512). In response, a query plan is generated (block 514). In accordance with an embodiment of the invention, as part of the query plan generation, the re-computation is made of the physical order (block 516). The offset to each column value may then be saved (block 518). The offsets to the column values may then be used during query execution (block 520).

FIG. 5C shows experimental results indicating a pathway improvement for various schemas tested in accordance with an embodiment of the invention. Each row (acxio032_b6_m, dwp2×1_b6_s, etc.) indicates a particular schema (i.e. particular database table definition).

The table shows the queries per hour (QPH) without alignment (Non-Aligned) and with the automated alignment per the present application (Aligned). A higher QPH is better than a lower QPH. The percentage increase (% change) in QPH is also shown. As seen, the QPH increase ranges to over 8% with the automated alignment per the present application.

The table also shows CPU seconds used per query (CPU Seconds per Qry) without alignment (Non-Aligned) and with the automated alignment per the present application (Aligned). A lower CPU seconds per query is better than a higher CPU seconds per query. The percentage decrease (% change) in CPU seconds per query is also shown. As seen, the percentage decrease ranges to over 7% with the automated alignment per the present application.

Figure 6:
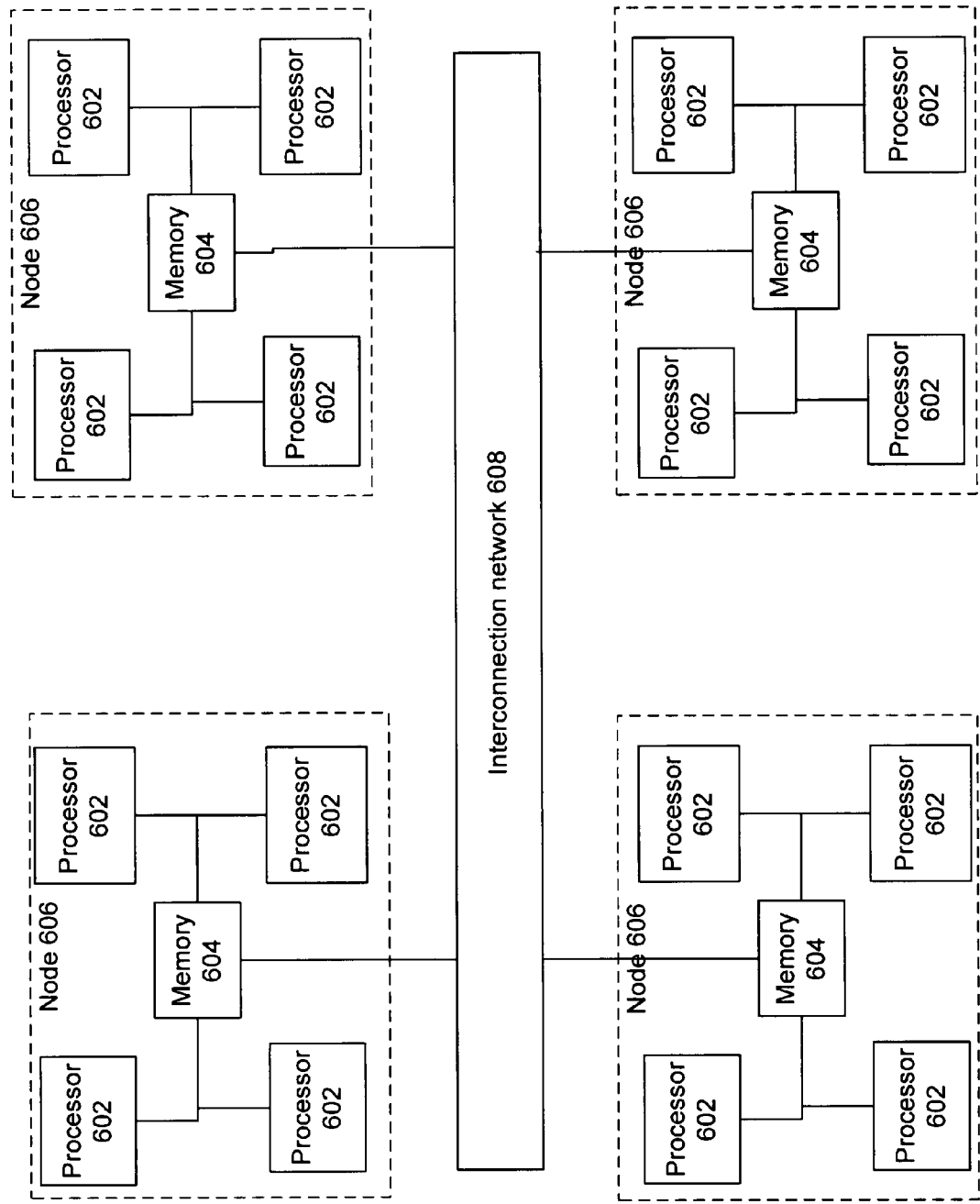
FIG. 6 is a schematic diagram depicting an example computer apparatus which may be configured to perform the methods in accordance with an embodiment of the invention.

FIG. 6 is a schematic diagram depicting an example computer apparatus which may be configured to perform the methods in accordance with an embodiment of the invention. In this example, the computer apparatus comprises a massively parallel processing system. In one embodiment, the computer apparatus may be configured with multiple processors 602 tightly integrated into a symmetric multiprocessing (SMP) nodes 606. The processors in each SMP node 606 may be connected to a common portion of the memory 604. An interconnection network 608 connects the SMP nodes 606. Other architectures for the computer apparatus may be used in alternate embodiments.

In accordance with an embodiment of the invention, the steps discussed above are implemented as processor-executable instructions stored on a computer-readable medium or stored in computer-readable memory. These processor-executable instructions may be run, for example, on a computer apparatus, such as depicted in FIG. 6, for example.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. An automated method, implemented by a computing device, to align column values to proper byte boundaries for rapid scanning in a parallel processing database system, the method comprising:

receiving, by the computing device, a table definition having a logical order of data fields, wherein the data fields include fixed length data fields and variable length data fields; and re-ordering, by the computing device, the data fields to create a physical order of data fields, wherein re-ordering includes:
  positioning a first fixed length data field on a proper byte boundary;
  positioning a remainder of the fixed length data fields after the first fixed length data field and adjacent to each other in descending order from largest byte alignment requirement to smallest byte alignment requirement, wherein a byte alignment requirement requires a beginning of a data field to be aligned to a $2^N$-byte boundary, where N is a whole number; and
  positioning the variable length data fields after the fixed length data fields in the logical order of the variable length data fields.

2. The method of claim 1, wherein administrative fields are positioned at a start of a record and, when a record is stored, zero padding is added thereto to align said first fixed length data field.

3. The method of claim 1, wherein, when a record is stored, zero padding is added, if needed, after a last variable length data field so that a next record is aligned on a proper byte boundary.

4. A non-transitory computer-readable medium storing computer-readable instructions that are configured to align column values to proper byte boundaries for rapid scanning in a parallel processing database system, the medium comprising:
  computer-readable instructions configured to receive a table definition having a logical order of data fields, wherein the data fields include fixed length data fields and variable length data fields; and
  computer-readable instructions configured to re-order the data fields to create a physical order of data fields, wherein the computer readable instructions configured to re-order the data fields include computer-readable instructions configured to:
    position a first fixed length data field on a proper byte boundary;
    position a remainder of the fixed length data fields after the first fixed length data field and adjacent to each other in descending order from largest byte alignment requirement to smallest byte alignment requirement, wherein a byte alignment requirement requires a beginning of a data field to be aligned to a $2^N$-byte boundary, where N is a whole number; and
    position the variable length data fields after the fixed length data fields in the logical order of the variable length data fields.

5. The medium of claim 4, wherein administrative fields are positioned at a start of a record, and, when a record is stored, zero padding is added thereto to align said first fixed length data field.

6. The medium of claim 4, wherein, when a record is stored, zero padding is added, if needed, after a last variable length data field so that a next record is aligned on a proper byte boundary.

7. A computer apparatus configured to align column values to proper byte boundaries for rapid scanning in a parallel processing database system, the apparatus comprising:
  a plurality of processors for executing computer-readable instructions; and
  memory configured to store the computer-readable instructions and data, wherein the computer-readable instructions are configured to:
    receive a table definition having a logical order of data fields, wherein the data fields include fixed length data fields and variable length data fields; and
    re-order the data fields to create a physical order of data fields, wherein the computer-readable instructions configured to re-order the data fields include computer-readable instructions configured to:
      position a first fixed length data field on a proper byte boundary;
      position a remainder of the fixed length data fields after the first fixed length data field and adjacent to each other in descending order from largest byte alignment requirement to smallest byte alignment requirement, wherein a byte alignment requirement requires a beginning of a data field to be aligned to a $2^N$-byte boundary, where N is a whole number; and
    position the variable length data fields after the fixed length data fields in the logical order of the variable length data fields.

8. The computer apparatus of claim 7, wherein administrative fields are positioned at a start of a record, and, when a record is stored, zero padding is added thereto to align said first fixed length data field.

9. The computer apparatus of claim 7, wherein, when a record is stored, zero padding is added, if needed, after a last variable length data field so that a next record is aligned on a proper byte boundary.

* * * * *